United States Patent
Drzymala et al.

(10) Patent No.: US 9,946,908 B2
(45) Date of Patent: *Apr. 17, 2018

(54) MODULE OR ARRANGEMENT FOR, AND METHOD OF, READING A TARGET BY IMAGE CAPTURE WITH AN IMAGING READER HAVING OFFSET IMAGING AND AIMING SYSTEMS

(71) Applicant: SYMBOL TECHNOLOGIES, LLC, Lincolnshire, IL (US)

(72) Inventors: Mark E. Drzymala, Saint James, NY (US); Edward D. Barkan, Miller Place, NY (US); Darran M. Handshaw, Sound Beach, NY (US)

(73) Assignee: Symbol Technologies, LLC, Holtsville, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/651,442

(22) Filed: Jul. 17, 2017

(65) Prior Publication Data

US 2017/0316238 A1 Nov. 2, 2017

Related U.S. Application Data

(63) Continuation of application No. 15/052,988, filed on Feb. 25, 2016.

(51) Int. Cl.
*G06K 7/10* (2006.01)
*H04N 5/225* (2006.01)
*G06K 7/14* (2006.01)

(52) U.S. Cl.
CPC ...... *G06K 7/10811* (2013.01); *G06K 7/10752* (2013.01); *G06K 7/10831* (2013.01);

(Continued)

(58) Field of Classification Search
CPC ....... G06K 7/10881; G06K 2207/1011; G06K 7/10851; G06K 7/10811; G06K 7/10722; G07K 7/10702

(Continued)

(56) References Cited

U.S. PATENT DOCUMENTS 5,591,955 A 1/1997 Laser
8,876,006 B2 * 11/2014 Vinogradov ....... G06K 7/10732
235/462.21

(Continued)

OTHER PUBLICATIONS

Search Report for British Patent Application No. 1702056.1 dated Jul. 19, 2017.

*Primary Examiner* — Karl D Frech
(74) *Attorney, Agent, or Firm* — Yuri Astvatsaturov

(57) ABSTRACT

An imaging sensor of an imaging reader senses return light from a target to be read by image capture along an imaging axis over a field of view that extends along mutually orthogonal, horizontal and vertical axes. Two aiming light assemblies are offset from the sensor and are spaced apart along the horizontal axis at opposite sides of the sensor, and direct two aiming light marks, each having a predetermined brightness, at the target. The aiming marks are collinear along the horizontal axis and have inner end regions that overlap on the target to form a bright aiming mark having a brightness greater than the predetermined brightness to visually indicate a center zone of the field of view, as well as outer end regions that visually indicate approximate end limits of the field of view, over a range of working distances.

20 Claims, 6 Drawing Sheets

(52) U.S. Cl.
 CPC ....... *G06K 7/10881* (2013.01); *G06K 7/1417* (2013.01); *H04N 5/2256* (2013.01)

(58) Field of Classification Search
 USPC .............. 235/462.21, 462.2, 462.45, 462.23, 235/462.24
 See application file for complete search history.

(56) References Cited

U.S. PATENT DOCUMENTS

| | | | |
|---|---|---|---|
| 8,936,195 B1 * | 1/2015 | Chang | G06K 7/10831 235/462.21 |
| 9,378,402 B2 * | 6/2016 | Duan | G06K 7/10732 |
| 2009/0084852 A1 | 4/2009 | Vinogradov et al. | |
| 2010/0155481 A1 | 6/2010 | Vinogradov et al. | |

* cited by examiner

MODULE OR ARRANGEMENT FOR, AND METHOD OF, READING A TARGET BY IMAGE CAPTURE WITH AN IMAGING READER HAVING OFFSET IMAGING AND AIMING SYSTEMS

CROSS-REFERENCE TO RELATED APPLICATION

This application is a continuation of U.S. patent application Ser. No. 15/052,988, filed on Feb. 25, 2016, and incorporated herein by reference in its entirety.

BACKGROUND OF THE INVENTION

The present disclosure relates generally to a module or an arrangement for, and a method of, reading a target, such as a bar code symbol, to be electro-optically read by image capture over a field of view in a range of working distances away from an imaging reader having imaging and aiming systems that are offset from each other, and, more particularly, to generating an aiming light pattern that visually indicates center and/or boundary zones of the field of view over the range of working distances to enable the target to be read in an optimum reading position despite the offset between the imaging and aiming systems.

Solid-state imaging systems or imaging readers have long been used, in both handheld and hands-free modes of operation, in many industries, such as retail, manufacturing, warehousing, distribution, postal, transportation, logistics, etc., to electro-optically read targets, such as one- or two-dimensional bar code symbols to be decoded. A known imaging reader generally includes an imaging module that is mounted in a housing, and that has an aiming light system for projecting a visible aiming light pattern along an aiming axis to visually locate a target within a field of view and, thus, advise an operator which way the reader is to be moved in order to position the aiming light pattern on the target, typically at a center thereof, prior to reading; an illumination system for emitting illumination light toward the target for reflection and scattering therefrom; and an imaging system having a solid-state imager with a sensor array of photocells or light sensors, and an optical assembly for capturing return illumination light scattered and/or reflected from the target being imaged over the field of view centered on an imaging axis, and for projecting the captured illumination light onto the imager to initiate capture of an image of the target. The imager produces electrical signals that are decoded and/or processed by a programmed microprocessor or controller into information related to the target being read, e.g., decoded data identifying the target. The controller is operative for transmitting the decoded data, either via a wireless or wired link, to a remote host for further processing, e.g., price retrieval from a price database to obtain a price for the identified target.

Low cost imagers with rolling shutters are sometimes used to minimize cost, but this advantageously dictates that the aiming system be physically offset horizontally away from the imaging system. This horizontal offset or parallax positions the aiming light pattern to be off-center relative to the imaging axis and off to one side of the reader, and is especially undesirable when targets in the near range close to the reader are to be read, because the operator would be erroneously guided to position the reader such that a part of the target would typically lie outside the field of view, and therefore, the target will often not be read.

It is known to configure the aiming system in the imaging reader with a laser, a focusing lens, and a pattern shaping optical element, such as a diffractive optical element (DOE), or a refractive optical element (ROE) to project the aiming light pattern as, for example, a pair of crosshairs for placement at the center of the target, or as continuous lines or rows of light spots, for placement on the target to approximately indicate the field of view. Yet, the lasers and the optical components of such laser-based aiming systems are relatively expensive to fabricate and be optically aligned when mounted in the reader, thereby making them unsuitable for low cost, imaging readers. It is also known to configure the aiming system in the imaging reader with one or more light emitting diodes (LEDs) to project the aiming light pattern as, for example, one or more generally circular spots, or as a single aiming line, for placement on the target. Such aiming light patterns generally indicate approximately where the center of the field of view is, or indicate approximately where the outer boundaries or end limits of the field of view are, but not both simultaneously. In any event, such laser-based and LED-based aiming systems are subject to the same aforementioned horizontal offset positioning error when the imaging and aiming systems are offset from each other.

Accordingly, it would be desirable to accurately indicate the center and/or end limits of the field of view of an imaging reader over a range of working distances despite a horizontal offset between the imaging and aiming systems of the reader.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
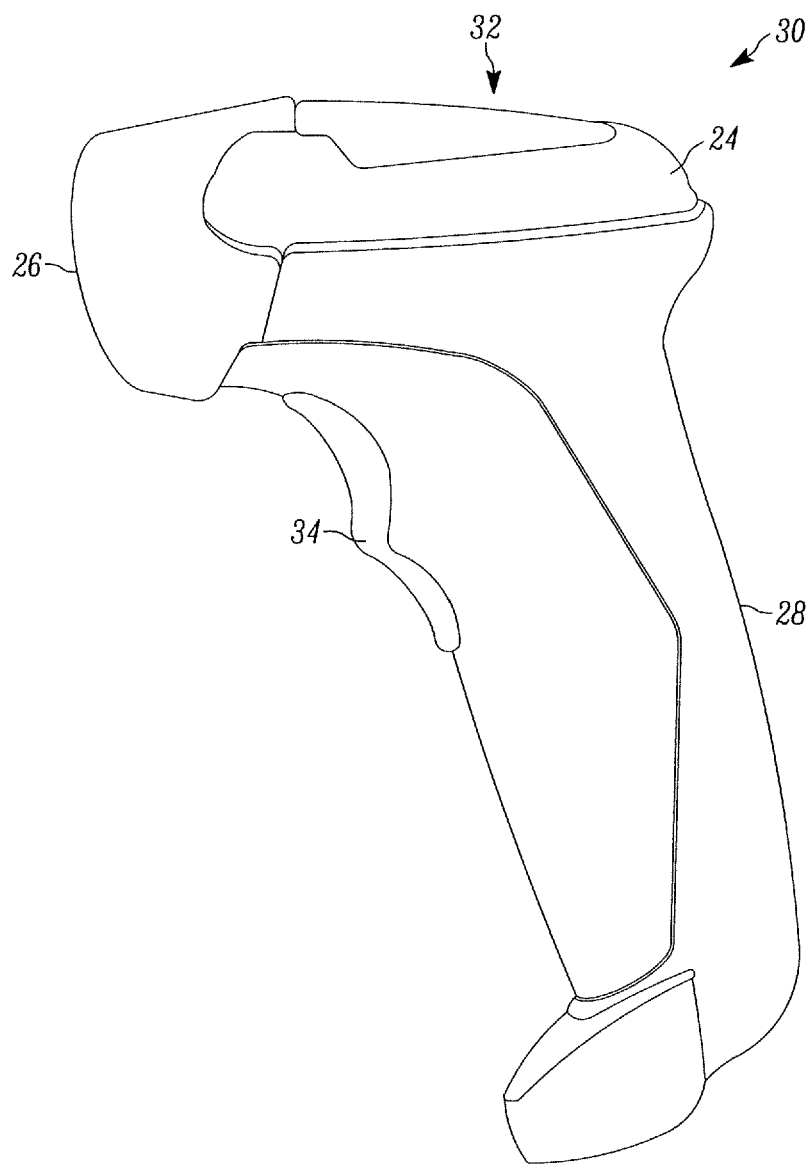
FIG. 1 is a perspective view of an exemplary embodiment of an electro-optical handheld reader for reading targets by image capture in which an imaging module is mounted in accordance with this disclosure.

Skilled artisans will appreciate that elements in the figures are illustrated for simplicity and clarity and have not necessarily been drawn to scale. For example, the dimensions and locations of some of the elements in the figures may be exaggerated relative to other elements to help to improve understanding of embodiments of the present invention.

The module, arrangement and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

In accordance with one feature of this disclosure, an imaging module is operative for reading a target, e.g., a bar code symbol, by image capture over a range of working distances away from the module. The module includes an imaging system and an aiming light system that is offset from the imaging system. The imaging system has an imaging sensor, e.g., a two-dimensional, solid-state, sensor, such as a charge coupled device (CCD) or a complementary metal oxide semiconductor (CMOS) array of image sensors, for sensing light returning from the target along an imaging axis over a field of view that extends along mutually orthogonal, horizontal and vertical axes that are generally perpendicular to the imaging axis. The aiming light system has a pair of aiming light assemblies spaced apart along the horizontal axis at opposite sides of the imaging system. The aiming light assemblies direct a pair of aiming light lines, each having a predetermined brightness, along a pair of aiming axes at the target. The aiming light lines are collinear along the horizontal axis and have inner linear end regions that extend past the imaging axis and that overlap on the target to form a bright, linear, aiming mark having a brightness greater than the predetermined brightness to visually indicate a center zone of the field of view over the range of working distances. An operator can then move the module and/or the target such that the bright aiming mark is substantially centered on the target in the field of view.

Preferably the aiming light lines have outer linear end regions that extend along the horizontal axis toward, and that visually indicate, approximate boundary zones or end limits of the field of view over the range of working distances. This also assists and guides the operator in finding an optimum reading position. Thus, the center and/or approximate end limits of the field of view of the imaging reader are accurately and simultaneously indicated over the range of working distances despite a horizontal offset between the imaging and aiming systems of the reader. Advantageously, the aiming axes and the imaging axis generally lie in a common plane and are generally parallel to one another. The aiming light lines increase in length, and the field of view increases proportionally in area, in a direction away from the module.

In accordance with another feature of this disclosure, the aforementioned imaging module is mounted in a housing of an imaging reader that has a light-transmissive window. The imaging sensor senses light returning from the target through the window, and the aiming light lines are directed through the window at the target. The housing is preferably embodied as a portable, point-of-transaction, gun-shaped, handheld housing, but could be embodied as a handheld, box-shaped housing, or any other configuration including a hands-free configuration.

In accordance with yet another feature of this disclosure, a method of reading a target by image capture over a range of working distances away from an imaging reader, is performed by sensing light returning from the target through the window along an imaging axis over a field of view that extends along mutually orthogonal, horizontal and vertical axes that are generally perpendicular to the imaging axis; by directing a pair of aiming light lines, each having a predetermined brightness, along a pair of aiming axes at the target; by configuring the aiming light lines to be collinear along the horizontal axis and to have inner linear end regions that extend past the imaging axis and that overlap on the target to form a bright, linear, aiming mark having a brightness greater than the predetermined brightness to visually indicate a center zone of the field of view over the range of working distances; and by positioning the bright aiming mark on the target. The method is further performed by guiding an operator to move the reader to an optimum reading position in the range of working distances by configuring the aiming light lines to have outer linear end regions that extend along the horizontal axis toward, and that visually indicate, approximate boundary zones of the field of view over the range of working distances, and by positioning the outer linear end regions on the target.

Figure 5:
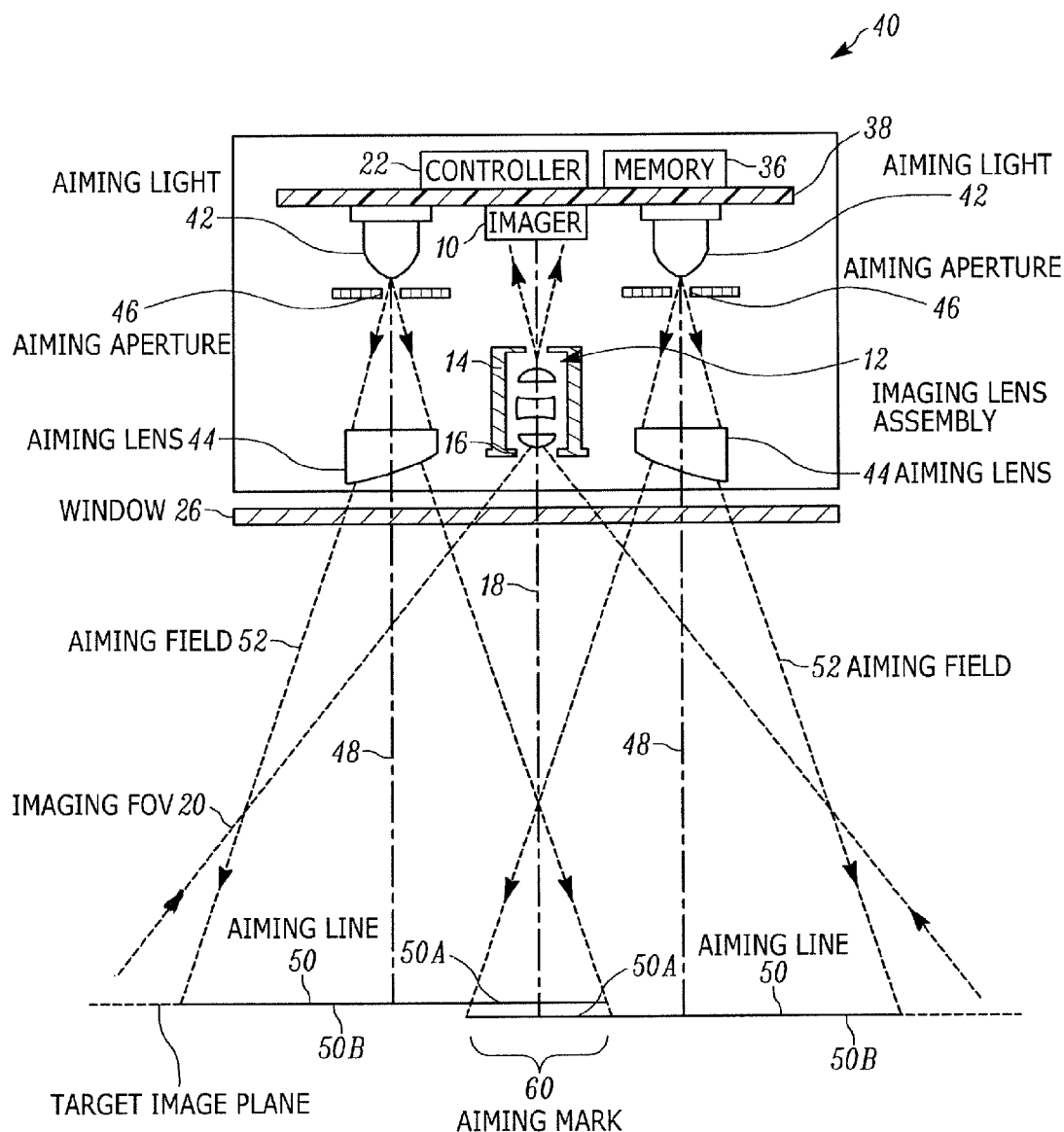
FIG. 5 is a diagrammatic view of components of the imaging and aiming systems of the reader of FIG. 1.

Reference numeral 30 in FIG. 1 generally identifies a handheld imaging reader for electro-optically reading targets, such as bar code symbols or like indicia. The reader 30 includes a housing 32 in which an imaging or scan engine or module 40, as described in detail below in connection with FIG. 5, is mounted. The housing 32 includes a generally elongated handle or lower handgrip portion 28 and a barrel or upper body portion or top 24 having a front end at which a light-transmissive window 26 is located. The cross-sectional dimensions and overall size of the handle 28 are such that the reader 30 can conveniently be held in an operator's hand. The body and handle portions 24, 28 may be constructed of a lightweight, resilient, shock-resistant, self-supporting material, such as a synthetic plastic material. The plastic housing 32 may be injection molded, but can also be vacuum-formed or blow-molded to form a thin hollow shell which bounds an interior space whose volume is sufficient to contain the various components of this reader 30. A manually actuatable trigger 34 is mounted in a moving relationship on the handle 28 in a forward facing region of the reader 30. An operator's forefinger is used to actuate the reader 30 to initiate reading by depressing the trigger 34. Although the housing 32 is illustrated as a portable, point-of-transaction, gun-shaped, handheld housing, this is merely exemplary, because the housing could also be embodied as a handheld, box-shaped housing, or with any other configuration including a hands-free configuration.

Figure 2:
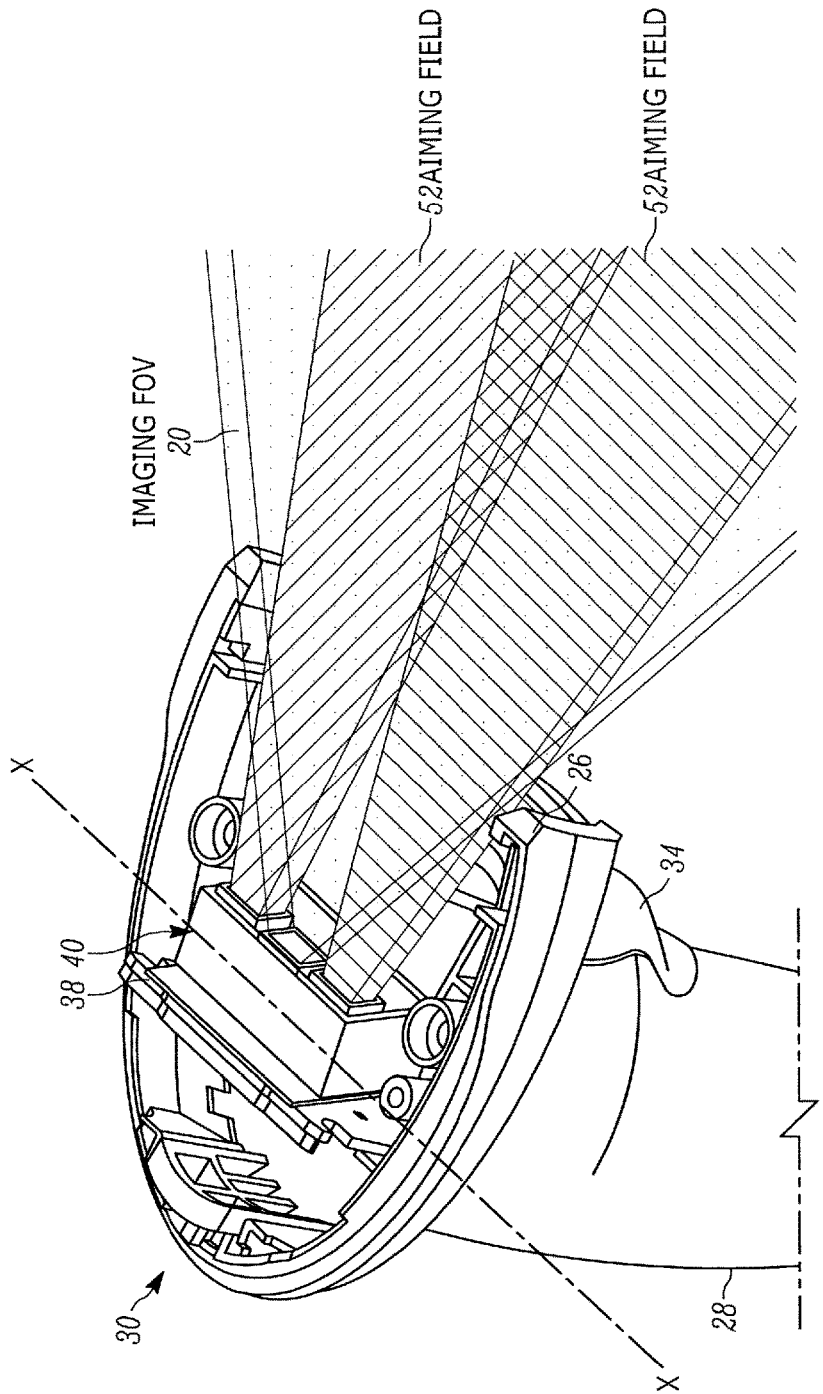
FIG. 2 is a perspective view of the reader of FIG. 1, with its top removed to illustrate components of imaging and aiming systems of the reader in accordance with this disclosure.
Figure 3:
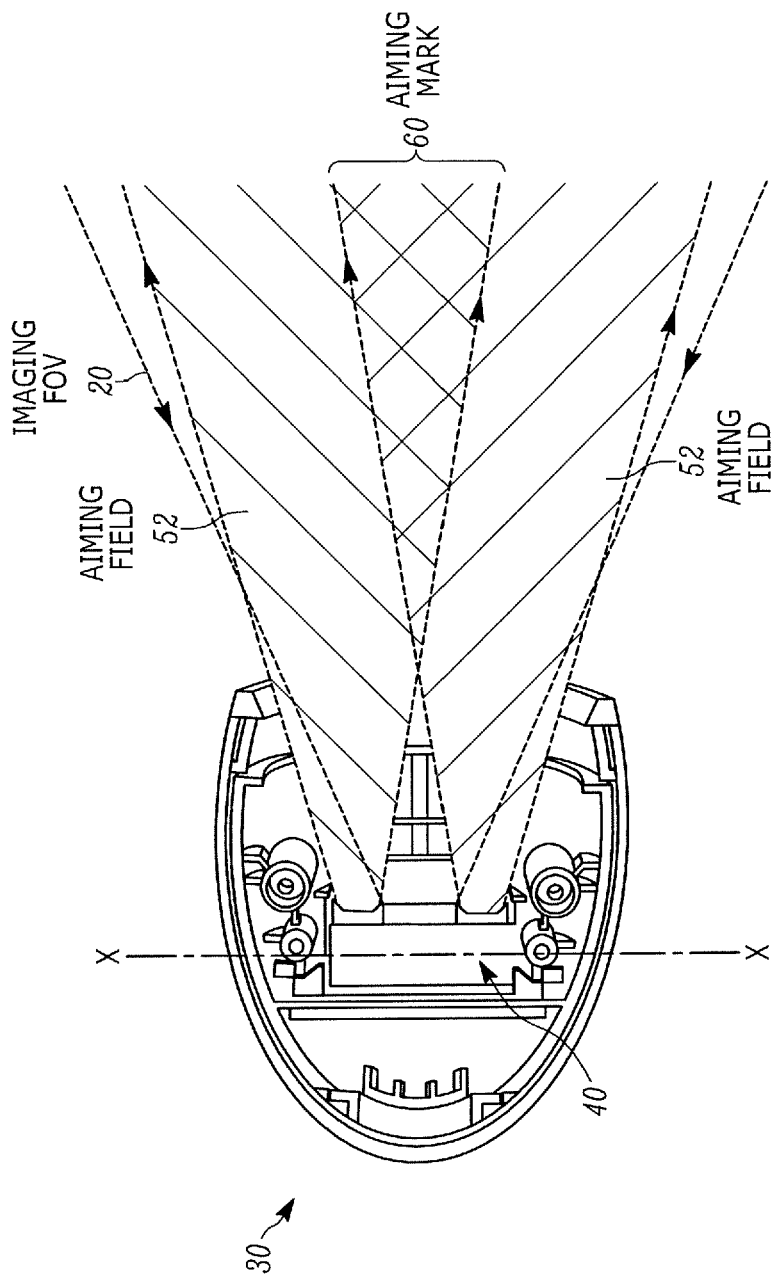
FIG. 3 is a top plan view of the reader of FIG. 2.

FIGS. 2-3 depict the reader 30 with the top 24 removed and exposing the module 40 therein. As best shown in FIG. 5, the module 40 includes an imaging system having a solid-state imager 10, and an imaging lens assembly 12 mounted in a tubular holder 14 that has a circular aperture 16. The imager 30 is a two-dimensional, charge coupled device (CCD) array or a complementary metal oxide semiconductor (CMOS) array of cells or sensors having either a global or a rolling shutter. Preferably, for low cost reasons, a CMOS imager is advantageously used with a rolling shutter. The imager 10 and imaging lens 12 are preferably aligned along a centerline or an optical imaging axis 18 generally centrally located within the upper body portion 24.

In operation, the imaging system captures return light passing through the window 26 along the imaging axis 18 centered in an imaging field of view 20 of the imaging lens assembly 12 from a target located in a range of working distances away from the window 26. The imager 10 is advantageously positioned closer to a rear wall of the upper body portion 24 than to a front of the housing in order to enlarge the imaging field of view 20 in the near range of working distances close to the reader 30. The imaging lens 32 preferably comprises one or more fixed-focus lenses, preferably a Cooke triplet, having an imaging plane at which the target is best focused and imaged onto the imager 10. The field of view 20 is generally rectangular and extends along the illustrated mutually orthogonal, horizontal (X-X)

and vertical (Y-Y) axes that are generally perpendicular to the imaging axis 18. The sensors produce electrical signals corresponding to a two-dimensional array of pixel information for an image of the target. The electrical signals are processed by a controller or programmed microprocessor 22 into data indicative of the target being read. The controller 22 is connected to a memory 36 for data retrieval and storage. The controller 22 and the memory 36 are mounted on a printed circuit board 38, which need not be mounted in the module 40 as shown, but could be mounted remotely from the module 40.

The imaging system is capable of acquiring a full image of the target under various lighting conditions. A non-illustrated illumination system may also be mounted on the module 40 to provide illumination light to illuminate the target. Exposure time is controlled by the controller 22. Resolution of the array can be of various sizes although a VGA resolution of 640×480 pixels may be used to minimize cost.

An aiming system, including a pair of aiming light assemblies, is supported on the module 40, and is offset from the imaging system. The aiming system is operative for projecting on the target an aiming light pattern 100 (see FIG. 6). The aiming light assemblies are spaced apart along the horizontal axis (X-X) at opposite sides of the imaging sensor 10. Each aiming light assembly includes an aiming light emitting diode (LED) 42, preferably, but not necessarily, mounted on the circuit board 38; a generally linear aiming aperture 46 that extends along the horizontal axis (X-X) in front of the LED 42; and a toroidal aiming lens 44 mounted away from its respective LED 42. Each LED 42, lens 44 and aperture 46 are centered and lie along a respective aiming axis 48. The aiming axes 48 generally lie in a common plane and are generally parallel to one another. As shown, the LEDs 42 and the sensor 10 are mounted along a common horizontal axis, but this need not be the case, since the LEDs 42 can be mounted either above or below the imager 10. Advantageously, the imaging axis 18 lies in the same plane and is generally parallel to the aiming axes 48.

Figure 6:
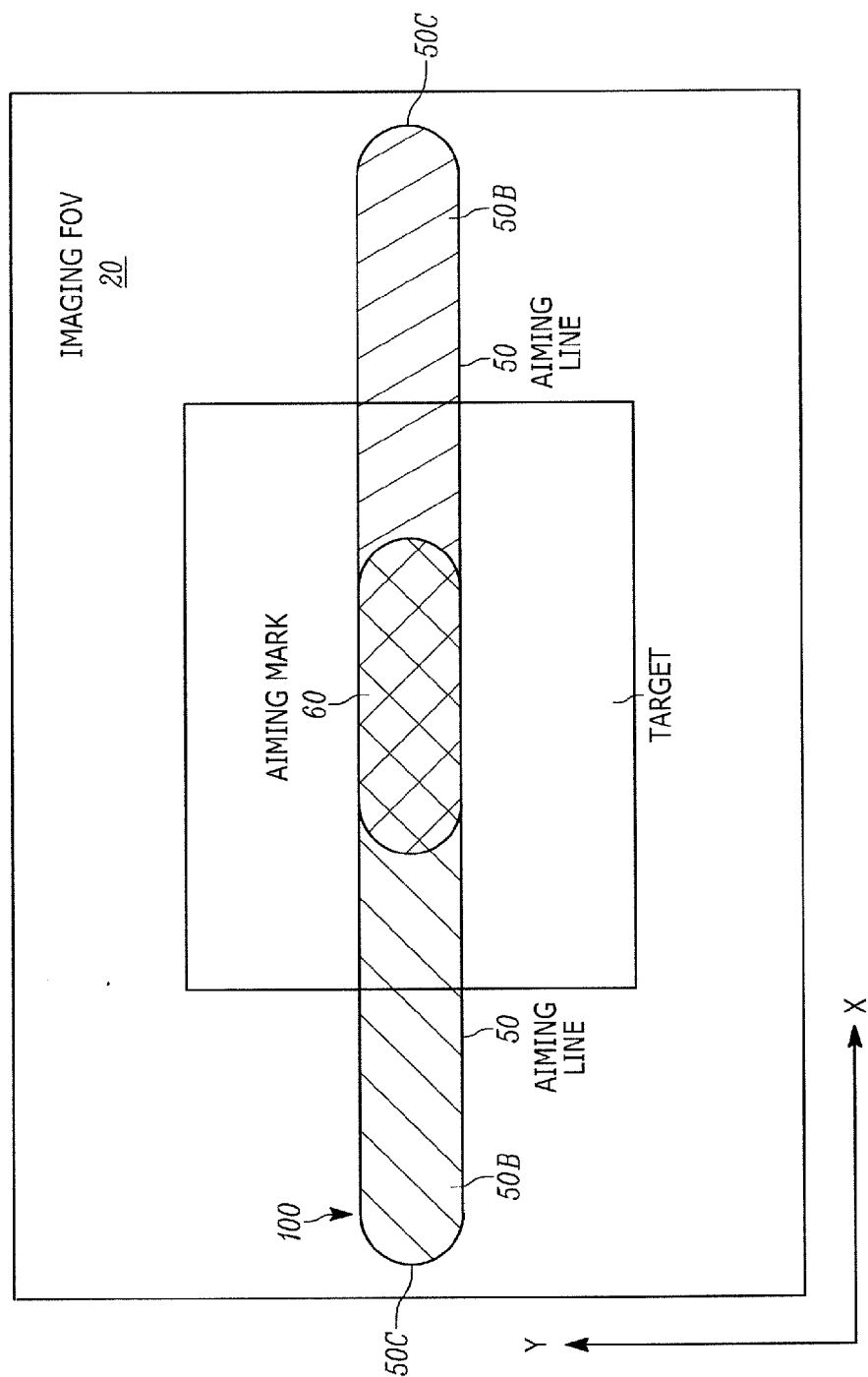
FIG. 6 is an enlarged, diagrammatic view of the aiming light pattern produced by the aiming system.

The aiming light assemblies are operative for directing the aiming light emitted from each LED 42 through the respective aperture 46 and the respective lens 44 along the respective aiming axis 48 over an aiming field 52 that is centered on the respective aiming axis 48 at the target. On the target, these aiming fields 52 describe a pair of aiming light lines 50, each having a predetermined brightness. As shown in FIGS. 5-6, the aiming light lines 50 are collinear along the horizontal axis (X-X). The aiming light lines 50 have inner linear end regions 50A that extend past the imaging axis 18 and that overlap on the target to form a bright, linear, aiming mark 60 having a brightness greater than the predetermined brightness due to the superposition of the inner linear end regions 50A to visually indicate a center zone of the field of view 20 over the range of working distances. Thus, the operator can position the aiming mark 60 on the target, and the target will be substantially centered in the imaging field of view 20 despite the offset between the imaging and aiming systems. This is helpful during a pick list mode of operation when choosing between multiple targets that are situated close together in the field of view.

The aiming light lines 50 also have outer linear end regions 50B that extend along the horizontal axis (X-X) toward, and that visually indicate, approximate boundary zones or end limits of the field of view 20 over the range of working distances. Thus, the operator is guided to position the outer linear end regions 50B on the target, such that the target will be substantially contained entirely within the imaging field of view 20 despite the offset between the imaging and aiming systems. Advantageously, the aiming light emitted from the aiming light assemblies may be of a different wavelength than the illumination light emitted from the illumination system in order to make the aiming light lines 50 and the aiming mark 60 more visually distinct from, and to visually contrast with, the illumination light.

Figure 4:
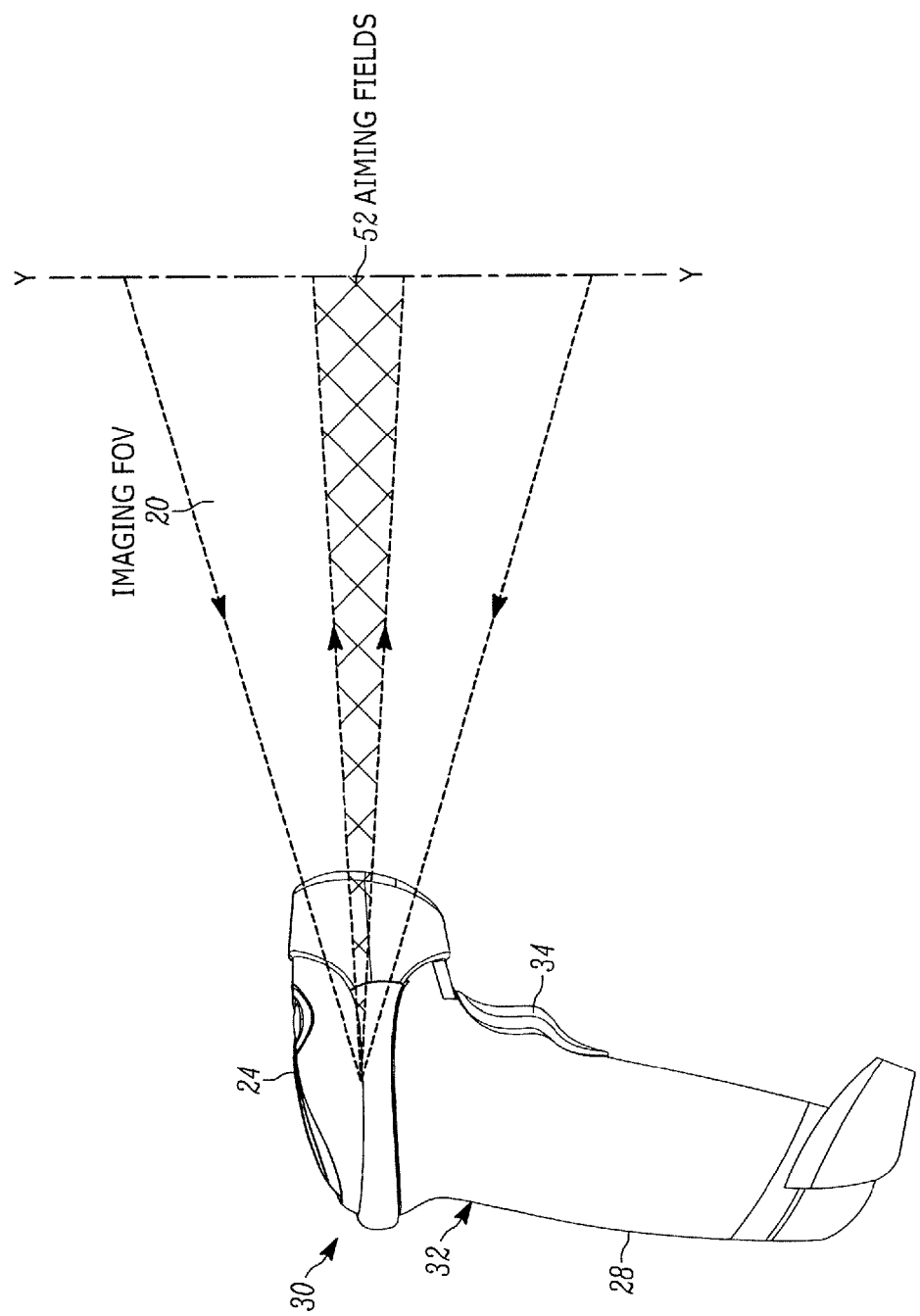
FIG. 4 is a side elevational view of the reader of FIG. 2.

As best seen in FIGS. 3-4, the aiming light lines 50 increase in length, and the field of view 20 increases proportionally in area, in a direction away from the reader 30. As seen in FIG. 6, the field of view 20 has a horizontal dimension along the horizontal axis (X-X), and the outer linear end regions 50B have opposite ends 50C that are spaced apart along the horizontal axis (X-X) by a distance that is slightly less, e.g., 10%-30% less, than the horizontal dimension over at least part of the range of working distances. This distance is advantageously optimized to read some difficult-to-read targets in a selected part of the working distance range, especially in the near part of said range, that is ideal for reading such difficult-to-read targets. By way of numerical example, in one preferred embodiment, at about 5 inches away from the window 26, the aiming line pattern 100, i.e., the distance between the opposite ends 50C of the outer linear end regions 50B, is about 5 inches in length along the horizontal axis (X-X) and about 0.5 inches in height along the vertical axis (Y-Y), and the bright aiming mark 60 is about 1.5 inches in length along the horizontal axis (X-X) and also about 0.5 inches in height along the vertical axis (Y-Y), and the horizontal dimension of the field of view 20 is slightly more than 5 inches. Thus, once the target is covered by the aiming line pattern 100, the target is guaranteed to be within the field of view 20. As the distance between the reader 30 and the target decreases, the bright aiming mark 60 decreases in size until it shrinks to a spot when the target comes close or touches the reader. This helps to center the target when reading in the near range despite the offset between the imaging and aiming systems.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing," or any other variation thereof, are intended to cover a non-exclusive inclusion, such that a process, method, article, or arrangement that comprises, has, includes, contains a list of elements does not include only those elements, but may include other elements not expressly listed or inherent to such process, method, article, or arrangement. An element proceeded by "comprises . . . a," "has . . . a," "includes . . . a,"

or "contains . . . a," does not, without more constraints, preclude the existence of additional identical elements in the process, method, article, or arrangement that comprises, has, includes, or contains the element. The terms "a" and "an" are defined as one or more unless explicitly stated otherwise herein. The terms "substantially," "essentially," "approximately," "about," or any other version thereof, are defined as being close to as understood by one of ordinary skill in the art, and in one non-limiting embodiment the term is defined to be within 10%, in another embodiment within 5%, in another embodiment within 1%, and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors, and field programmable gate arrays (FPGAs), and unique stored program instructions (including both software and firmware) that control the one or more processors to implement, in conjunction with certain non-processor circuits, some, most, or all of the functions of the method and/or arrangement described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein, will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

The invention claimed is:

1. An imaging module for reading a target by image capture over a range of working distances away from the module, comprising:
   an imaging system including an imaging sensor for sensing light returning from the target along an imaging axis over a field of view that extends along mutually orthogonal, horizontal and vertical axes that are generally perpendicular to the imaging axis, the field of view having a width along the horizontal axis and a height along the vertical axis; and
   an aiming light system offset from the imaging system and including a pair of aiming light assemblies spaced apart along the horizontal axis at opposite sides of the imaging sensor, and operative for directing a pair of aiming light marks, each having a predetermined brightness, along a pair of aiming axes at the target, the aiming light marks being collinear along the horizontal axis and having inner end regions that extend past the imaging axis and that overlap on the target to form an aiming mark having a brightness greater than the predetermined brightness to visually indicate a center zone of the field of view over the range of working distances;
   each aiming light mark having a mark width that is a first fraction of the width of the field of view, and a mark height that is a second fraction of the height of the field of view, the first fraction being greater than the second fraction.

2. The module of claim 1, wherein the aiming light marks have outer end regions that extend along the horizontal axis toward, and that visually indicate, approximate boundary zones of the field of view over the range of working distances.

3. The module of claim 2, wherein the outer end regions have opposite ends that are spaced apart along the horizontal axis by a distance that is slightly less than the width of the field of view over at least part of the range of working distances.

4. The module of claim 1, wherein each aiming light assembly includes an aiming light emitting diode (LED), an aiming aperture, and an aiming lens.

5. The module of claim 1, wherein the aiming axes and the imaging axis generally lie in a common plane and are generally parallel to one another.

6. The module of claim 1, wherein the aiming light marks increase in length, and the field of view increases proportionally in area, in a direction away from the module.

7. An imaging reader for reading a target by image capture over a range of working distances away from the reader, comprising:
   a housing having a light-transmissive window; and
   an imaging module mounted in the housing, the module having
   an imaging system including an imaging sensor for sensing light returning from the target through the window along an imaging axis over a field of view that extends along mutually orthogonal, horizontal and vertical axes that are generally perpendicular to the imaging axis, the field of view having a width along the horizontal axis and a height along the vertical axis, and
   an aiming light system offset from the imaging system and including a pair of aiming light assemblies spaced apart along the horizontal axis at opposite sides of the imaging sensor, and operative for directing a pair of aiming light marks, each having a predetermined brightness, along a pair of aiming axes through the window at the target, the aiming light marks being collinear along the horizontal axis and having inner end regions that extend past the imaging axis and that overlap on the target to form an aiming mark having a brightness greater than the predetermined brightness to visually indicate a center zone of the field of view over the range of working distances;

each aiming light mark having a mark width that is a first fraction of the width of the field of view, and a mark height that is a second fraction of the height of the field of view, the first fraction being greater than the second fraction.

8. The reader of claim 7, wherein the aiming light marks have outer end regions that extend along the horizontal axis toward, and that visually indicate, approximate boundary zones of the field of view over the range of working distances.

9. The reader of claim 7, wherein the outer end regions have opposite ends that are spaced apart along the horizontal axis by a distance that is slightly less than the width of the field of view over at least part of the range of working distances.

10. The reader of claim 7, wherein each aiming light assembly includes an aiming light emitting diode (LED), an aiming aperture, and an aiming lens.

11. The reader of claim 7, wherein the aiming axes and the imaging axis generally lie in a common plane and are generally parallel to one another.

12. The reader of claim 7, wherein the aiming light marks increase in length, and the field of view increases proportionally in area, in a direction away from the reader.

13. The reader of claim 7, wherein the housing has a handle for handheld operation.

14. The reader of claim 7, wherein the housing has a rear wall spaced away from the window, and wherein the imaging sensor is mounted rearwardly in the housing and closer to the rear wall than to a front of the housing.

15. A method of reading a target by image capture over a range of working distances away from an imaging reader, comprising:

sensing light returning from the target through the window along an imaging axis over a field of view that extends along mutually orthogonal, horizontal and vertical axes that are generally perpendicular to the imaging axis, the field of view having a width along the horizontal axis and a height along the vertical axis;

directing a pair of aiming light marks, each having a predetermined brightness, along a pair of aiming axes at the target;

configuring the aiming light marks to be collinear along the horizontal axis and to have inner end regions that extend past the imaging axis and that overlap on the target to form an aiming mark having a brightness greater than the predetermined brightness to visually indicate a center zone of the field of view over the range of working distances; each aiming light mark having a mark width that is a first fraction of the width of the field of view, and a mark height that is a second fraction of the height of the field of view, the first fraction being greater than the second fraction; and positioning the bright aiming mark on the target.

16. The method of claim 15, and guiding an operator to move the reader to an optimum reading position in the range of working distances by configuring the aiming light marks to have outer end regions that extend along the horizontal axis toward, and that visually indicate, approximate boundary zones of the field of view over the range of working distances, and by positioning the outer end regions on the target.

17. The method of claim 15, and configuring the outer end regions to have opposite ends that are spaced apart along the horizontal axis by a distance that is slightly less than the width of the field of view over at least part of the range of working distances.

18. The method of claim 15, and configuring the aiming axes and the imaging axis to generally lie in a common plane and to extend generally parallel to one another.

19. The method of claim 15, wherein the aiming light marks increase in length, and the field of view increases proportionally in area, in a direction away from the reader.

20. The method of claim 15, and providing a handle on the reader for handheld operation by the operator.

* * * * *